United States Patent
Reusche et al.

(10) Patent No.: US 6,353,708 B1
(45) Date of Patent: Mar. 5, 2002

(54) APPARATUS FOR MOUNTING AN ELECTRICAL HEATER THROUGH A WATER TANK DRAIN PLUG OPENING

(75) Inventors: Thomas K. Reusche, Elburn; Donald B. Owen, Batavia, both of IL (US)

(73) Assignee: Allied Precision Industries Inc., Elburn, IL (US)

(*) Notice: Subject to any disclaimer, the term of this patent is extended or adjusted under 35 U.S.C. 154(b) by 0 days.

(21) Appl. No.: 09/638,563

(22) Filed: Aug. 14, 2000

Related U.S. Application Data (63) Continuation-in-part of application No. 09/239,837, filed on Jan. 29, 1999, now Pat. No. 6,151,448.

(51) Int. Cl.[7] ............................. F24H 1/20; H05B 3/78
(52) U.S. Cl. ..................................... 392/455; 392/501
(58) Field of Search .................... 392/455, 441, 392/501

(56) References Cited

U.S. PATENT DOCUMENTS

| | | | |
|---|---|---|---|
| 3,224,796 A | * 12/1965 | Burkitt | 285/149.1 |
| 3,497,677 A | * 2/1970 | Blain | 219/523 |
| 3,641,473 A | 2/1972 | Attaway | |
| 3,746,836 A | 7/1973 | Summerfield et al. | |
| 4,068,116 A | 1/1978 | McKinstry | |
| 4,124,793 A | 11/1978 | Colman | |
| 4,848,616 A | 7/1989 | Nozaki | |
| 4,946,396 A | 8/1990 | Saitoh | |
| 5,109,474 A | 4/1992 | Cameron | |
| 5,159,659 A | 10/1992 | Cameron | |
| 5,191,634 A | 3/1993 | Couch | |
| 5,305,419 A | 4/1994 | Cameron | |
| 5,395,264 A | 3/1995 | Keith | |
| 5,462,452 A | 10/1995 | Devine | |
| 5,828,810 A | 10/1998 | Frank et al. | |
| 5,990,455 A | 11/1999 | Scott et al. | |
| 6,028,294 A | 2/2000 | Nilson | |
| 6,072,152 A | * 6/2000 | Landry | 219/202 |

OTHER PUBLICATIONS

Product brochure from Allied Precision Industries, Inc. entitled "Allied De–Icers and Heaters"; Copyright 1997.
Web page for Farm Innovators Inc. showing Drain Plug De–Icer Model DPH–15.

* cited by examiner

*Primary Examiner*—Teresa Walberg
*Assistant Examiner*—Thor Campbell
(74) *Attorney, Agent, or Firm*—McAndrews, Held & Malloy, Ltd.

(57) ABSTRACT

An electric water tank heater is installable through the drain plug opening of a water tank. The heater includes a power cord interconnected with a heating element through a temperature control device for delivering electrical power to the heating element in a controlled fashion. A housing hermetically seals the interconnection between the heating element, the power cord and the temperature control device. The power cord extends through the drain plug opening of the tank and terminates in a conventional male plug that is configured for insertion into a reciprocal power outlet. A drain plug adapter is secured about the power cord and is mountable through the drain plug opening in a water-tight fashion. The drain plug adapter may be permanently mounted about the power cord or may be removably mountable about the power cord. The power cord may include a detachable connector interposed between the heating element and the male plug. The connector is smaller than the electrical plug, and, as a result, the heater may be installed through drain plug openings that are too small to permit the passage of the electrical plug. The connector can be positioned anywhere along the length of the power cord, and integrally formed with the male plug or the heater housing. The drain plug adapter may be used separately or in combination with the detachable connector.

12 Claims, 9 Drawing Sheets

APPARATUS FOR MOUNTING AN ELECTRICAL HEATER THROUGH A WATER TANK DRAIN PLUG OPENING

CROSS REFERENCE TO RELATED APPLICATIONS

This application is a continuation-in-part of application Ser. No. 09/239,837, filed Jan. 29, 1999 now Pat. No. 6,151,448.

STATEMENT REGARDING FEDERALLY SPONSORED RESEARCH OR DEVELOPMENT (NOT APPLICABLE)

BACKGROUND OF THE INVENTION

This invention relates generally to electric water heaters, and more particularly to electric water heaters for use in livestock water tanks exposed to low temperature extremes.

Livestock require large amounts of water throughout the year. In order to provide livestock with needed water during winter months, exterior livestock watering tanks are seasonally equipped with electric water heaters to prevent the water contained therein from icing over during cold temperatures. These heaters either float in the tank or rest on the bottom of the tank. The power cord extends from the heater and over the side wall of the tank for connection to a power outlet. Because the heater is not fixed in the tank in these prior designs, it is possible for the heater to be thrown from the tank when an animal drags on the power cord.

Commercially available water tanks typically include a drain opening in their side wall so that the tanks can be drained, e.g. for transporting or for putting in fresh water. It is desirable to have a tank heater in which the power cord extends from the tank through the drain opening so that cord is out of reach of the livestock. However, the size of the drain plug opening varies depending on the manufacturer, and in many instances the drain openings are too small to permit the male plug of the power cord to be inserted through the opening. As a result, there is a need for a tank heater that can be mounted through a variety of sizes of drain plug openings without modifying the drain plug or the water heater.

BRIEF SUMMARY OF THE INVENTION

An object of the present invention is to provide an electric heater for use in livestock watering tanks that reduces the likelihood of the heater being displaced from the tank.

Another object of the present invention is to provide an electric heater that can be used with a variety of different commercially available water tanks, wherein the power cord for the heater extends through the drain plug opening of the tank.

Still another object of the present invention is to provide an electric water tank heater that is low cost and economical to manufacture.

A further object of the present invention is to provide an electric water tank heater that is rugged and durable.

Still another object of the present invention is to provide an electric water tank heater that can be installed through drain plug openings of varying diameters.

Yet another object of the present invention is to provide an apparatus that permits an electric water tank heater to be installed through the drain plug openings of varying diameters.

These and other objects are addressed by an apparatus for mounting an electric water heater through the drain plug opening of a water tank. The water heater includes a submersible electric heating element, a power cord having a first end electrically connected to the heating element and a second end interconnected with the heating element for delivering power thereto. The apparatus includes a drain plug adapter mounted about the power cord and being configured for installation through the drain plug opening to seal the drain plug opening against water leakage therethrough.

According to one embodiment, the drain plug adapter comprises a connector portion mounted about the power cord. The connector portion may be removably mounted on the power cord. In this embodiment, the connector portion may comprise first and second portions that are configured to clamp around the power cord. Alternatively, the connector portion may be permanently secured about the power cord. In this embodiment, the connector portion may be integrally formed with the housing of the submersible heating element. The connector portion has a first portion that is larger than the drain plug opening and a threaded boss extending from the first portion and being sized for insertion through the drain plug opening. A nut is threadable on the boss for securing the connector portion within the drain plug opening. A seal adapted to seal the drain plug opening around the boss to prevent water leakage therethrough.

According to another aspect of the present invention, the power cord may include a detachable connector interposed between the heating element and the male plug such that the power cord can be separated for insertion through the drain plug opening. The detachable connector can be positioned anywhere along the length of the power cord, and may have a portion that is integrally formed with the male plug, or the housing of the heater.

The heater includes a temperature control device interconnected between the power cord and the heating element for regulating power to the heating element to maintain the temperature of the contents of the tank within a preselected range. The interconnection between the heating element, the temperature control device and the power cord is contained within a hermetically sealed housing.

DETAILED DESCRIPTION OF THE PREFERRED EMBODIMENT OF THE INVENTION

Referring to the drawings, an improved electric water tank heater 10 includes an electric heating element 12 that is mountable within a water tank 14 for heating the contents of the tank. A power cord 16 is interconnected with the heating element 12 through a temperature control device 18 for delivering electrical power to the heating element in a controlled fashion so as to regulate the temperature of the contents of the tank 14. The power cord 16 extends through the drain plug opening 20 (see FIGS. 2 and 8) of the tank 14 and terminates in a conventional male plug 22 that is configured for insertion into a conventional power outlet (not shown). The heater 10 includes a housing 26 that hermetically seals the interconnection temperature control device 18, the power cord 16, and the heating element 12 from moisture infiltration. The housing 26 includes a mechanism for affixing the heater to the drain plug opening 20 in a sealed manner, thereby preventing inadvertent removal of the heater 10 and also preventing the contents of the tank 14 from leaking out of the drain plug opening 20.

Figure 4:
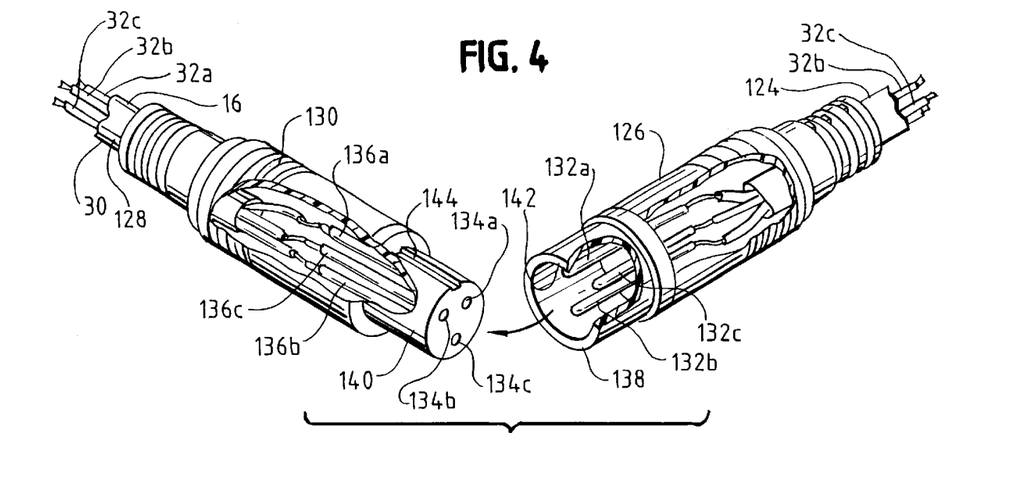
FIG. 4 is a perspective view of a detachable cord connector employed in the electric heater of FIG. 1.

As can best be seen in FIG. 4, the power cord 16 includes an outer insulating sheath 30 enclosing a line or "hot" conducting wire 32a, a neutral conducting wire 32b, and a ground conducting wire 32c. Each wire 32a–c is further provided with its own insulating sheath.

The distal end 35 of the power cord 16 is connected to conventional three-prong electrical plug 22. Three prongs 34a–c extend from the front face of the plug 22 and are oriented for insertion into a convention power outlet. In particular, the plug includes a line prong 34a, a neutral prong 34b, and a ground prong 34c. The power cord 16 extends from the rear of the plug 22 with the sheath 30 of the power cord being encapsulated within the body of the plug. Within the plug, the sheath 30 has been removed to allow the wires 32a–c to be separated for interconnection with the appropriate conductive prongs 34a–c. In particular, the line wire 32a is electrically and mechanically interconnected with the line prong 34a, the neutral wire 32b is electrically and mechanically interconnected with the neutral prong 34b, and the ground wire 32c is electrically and mechanically interconnected with the ground prong 34c.

The proximal end 36 of the power cord 22 extends into the housing 26 where it is electrically interconnected with the heating element 12 and the temperature control device 18. In this respect, the housing 26 includes an outer shell 40 that defines an inner cavity 42 enclosing the interconnection between the power cord 16, the temperature control device 18, and the heating element 12. The outer shell 40 is formed from a suitable material such as plastic in a conventional manner such as injection molding. The inner cavity 42 is hermetically sealed by filling it with a suitable waterproof sealant such as epoxy resin or a silicone sealing material.

The heating element 12 is in the form of an elongated tubular member. The first and second ends 50, 66 of the heating element 12 are positioned within the housing 26 where they are appropriately interconnected with the power cord. In particular, the first end 50 of the heating element 12 is connected to the proximal end of the line wire 32a through the temperature control device 18 and the second end 60 of the heating element 12 is connected to the neutral conductor wire 32b. The ground conductor wire 32c is connected to a bracket 54 which is used to secure the temperature control 18 device to a thermally conductive strap 56.

The temperature control device 18 is in the form of a thermostat or temperature responsive switch that is interposed between the heating element 12 and the power cord 16. The temperature control device 18 is disposed in the cavity 42 and has a first terminal 46 and a second terminal 48. The first terminal 46 is connected to the proximal end of the line wire 32a and the second terminal 48 is connected to the first end 50 of the elongated heating element by a wire 52. The temperature control device 18 senses the temperature of the contents of the tank 14 through a thermally conductive strap 56 and cycles the heating element 12 on and off to maintain the contents of the tank within a predetermined temperature range. In particular, the temperature control device 18 turns on the heating element 12 when the temperature of the contents falls below a lower set point, which in the preferred embodiment is on the order of 40° F. Conversely, the temperature control device 18 turns the heating element 12 off when the temperature of the contents rises above an upper set point, which in the preferred embodiment is on the order of 60° F. A suitable temperature control device 18 is constructed in accordance with U.S. Pat. No. 4,835,336, the contents of which are hereby incorporated by reference.

The thermally conductive strap 56 is affixed at its midpoint in a thermally conductive manner to the temperature control device 18. The point of attachment divides the strap 56 into a heat sensing segment 58 and a cooling segment 60. The heat sensing segment 56 extends from the housing 26 and is affixed at its distal end 62 to the elongated heating element 12. The cooling segment 60 of the thermally conductive strap 56 similarly projects from the housing 26, but avoids contact with the heating element 12. Insulating tape surrounds the temperature control device 18 to prevent minimize the heat sink of the epoxy filler on the temperature control device 18.

The heating element 12 includes a first linear portion 70 that extends from the housing 26 in a direction generally perpendicular to the drain plug opening 20. The first linear portion 70 extends to a curved portion 72 that in turn extends into a second linear portion 74. The second linear portion 74 is spaced apart from and generally parallel to first linear portion 70. The second linear portion 74 extends back towards the housing 26 and into a third linear portion 76 that extends generally perpendicular from the second linear portion 74. The third linear portion 76 extends into a fourth linear portion 78 that is generally perpendicular to the third linear portion 76. The fourth linear portion 78 extends away from the housing 26 and into a curved portion 80 that in turn extends into a fifth linear portion 82. The fifth linear portion 82 is generally parallel to and spaced apart from the fourth linear portion 78. The fifth linear portion 82 extends back into the housing 26 where it is interconnected with the power cord 16 as described above. It will be appreciated that the shape of the heating element 12 is merely illustrative and that the heating element may take numerous other configurations without departing from the scope of the present invention. For example, a suitable alternative is illustrated in aforementioned U.S. Pat. No. 4,835,336.

Figure 2:
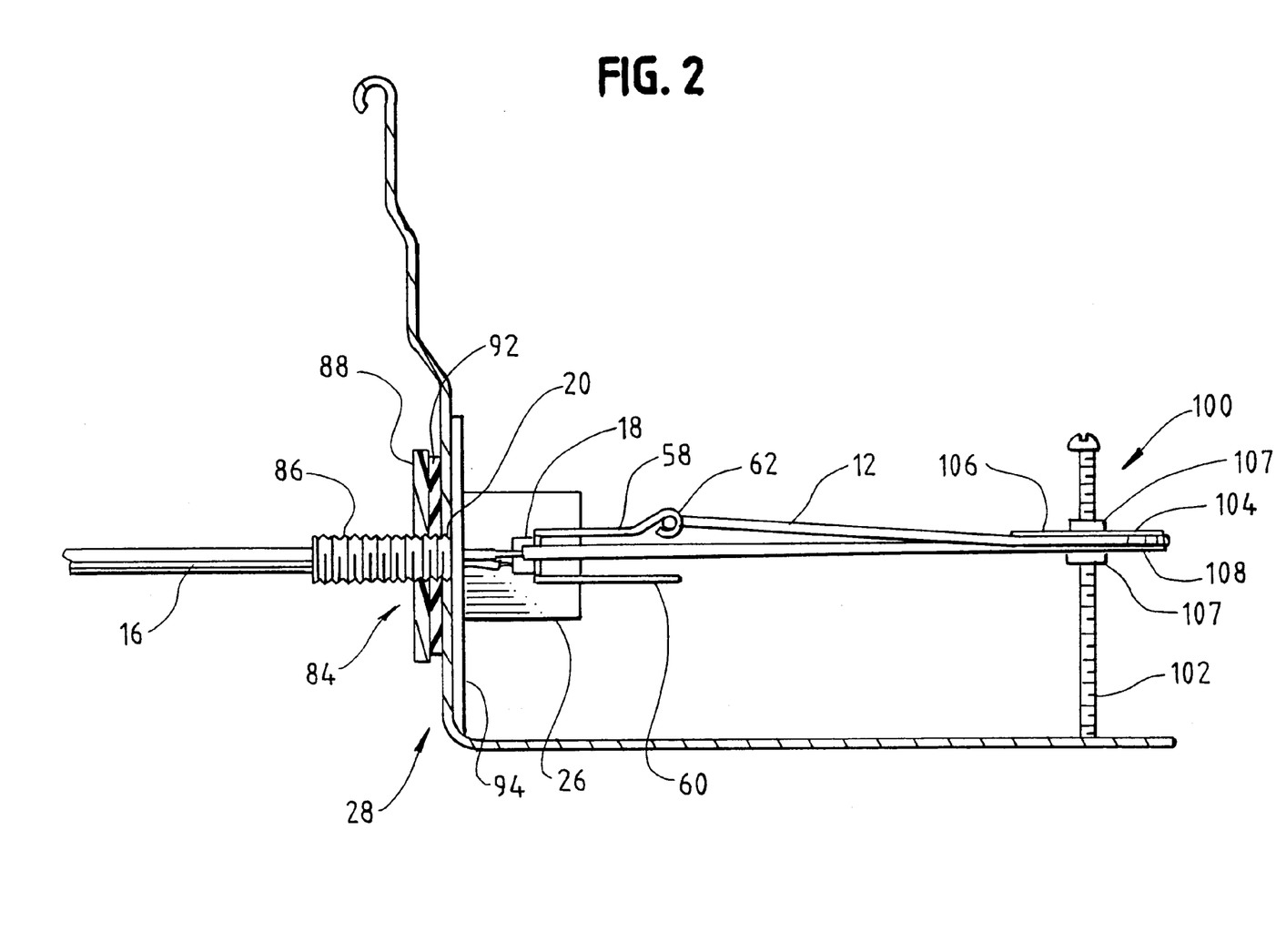
FIG. 2 is cross sectional view along line 2—2 of FIG. 1.
Figure 8:
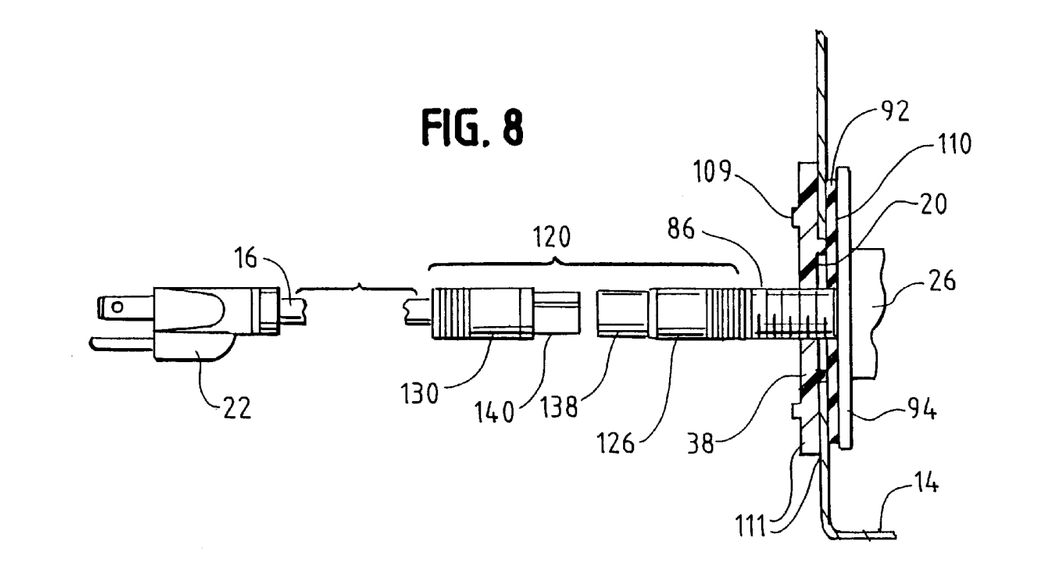
FIG. 8 is a partial side view of the electric heater showing an embodiment in which a portion of the detachable connector is integrally formed with the housing of the heater.

A drain plug adapter 83 is provided for mounting the heater 10 through the drain plug opening 20 of the water tank 14. The drain plug adapter 83 includes a connector portion 84 consisting of a threaded boss 86 extending from the back of the housing 26. The threaded boss 86 surrounds the proximal end 36 of the power cord 16 and is sized for insertion through the drain plug opening 20. A reciprocal nut 88 threads onto the boss 86 from outside the tank 14 to secure the housing 26 to the tank. The nut 88 includes a slot 90 (see FIGS. 9 and 10) to allow it to slide into place over the power cord 16. The nut 88 is then threaded onto the boss 86 and tightened against the tank 14. A rubber washer 92 fits around the boss and, as is shown in FIG. 8, is compressed between the housing 26 and the tank 14 as the nut is tightened onto the boss 86. Alternatively, the washer 92 may be positioned on the outside of the tank, as is shown in FIG. 2. The washer 92 forms a watertight seal at the drain plug opening 20 to prevent leakage therethrough.

In the preferred embodiment, the tank heater 10 is configured for use in water tanks having drain plug openings ranging from 0.75 inches in diameter to 2.0 inches in diameter. In this respect, the threaded boss 86 preferably has an outer diameter that is less than 0.75 inches. The seal washer 92 preferably has an inner diameter which approximates the outer diameter of the boss 86 and an outer diameter that is greater than 2.0 inches. The back wall 94 of the housing 26 is also configured to extend beyond the edge of a 2 inch diameter drain plug opening. In the illustrated embodiment, the housing 26 has a planar back wall 94 that is on the order of 2.75 inches wide and 3.25 inches high. Similarly, the nut has an outer diameter on the order of 2.75 to 3.0 inches.

Figure 12:
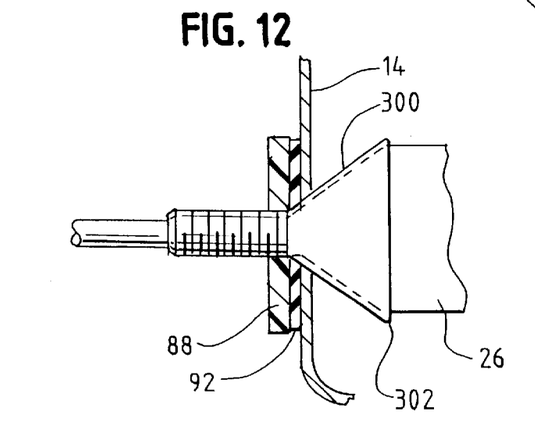
FIG. 12 is a partial side view of an alternative embodiment of the heater in which the housing has a cone-shaped back face.
Figure 13:
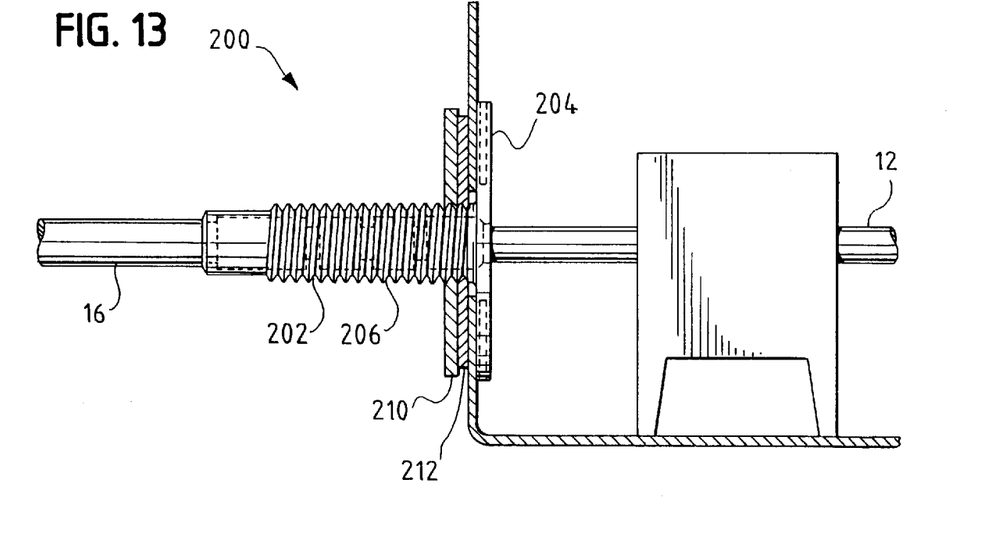
FIG. 13 is a side view of a removable drain plug adapter in accordance with the present invention.
Figure 14:
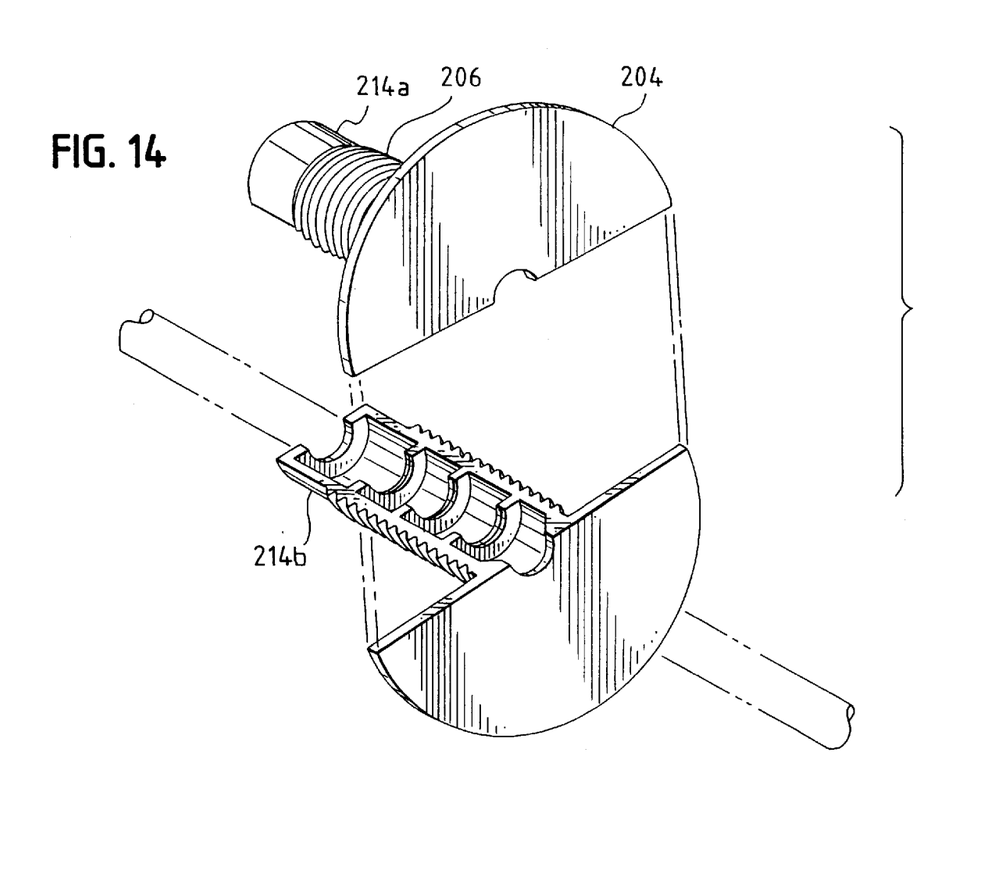
FIG. 14 is a partial exploded perspective view of the removable drain plug connector of FIG. 13.
Figure 15A:
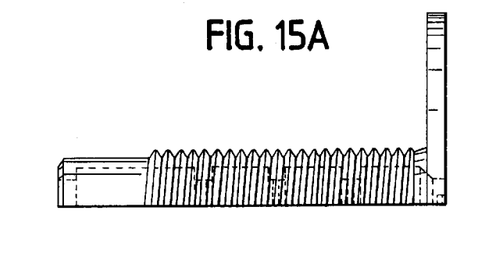
FIGS. 15A–C are elevation views of one half of the removable connector of FIG. 13.
Figure 15B:
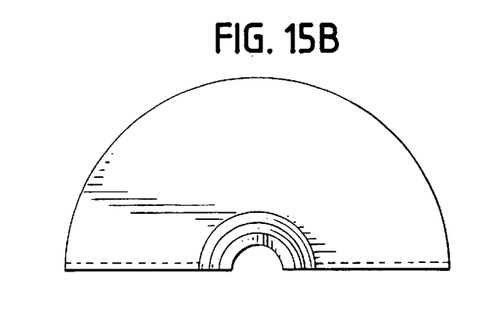
Figure 15C:
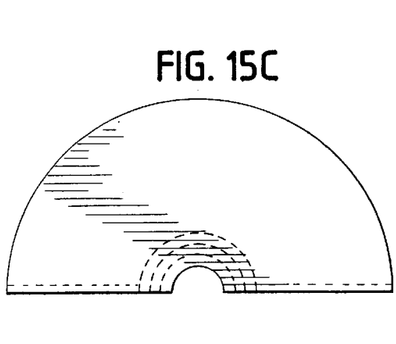
Figure 16:
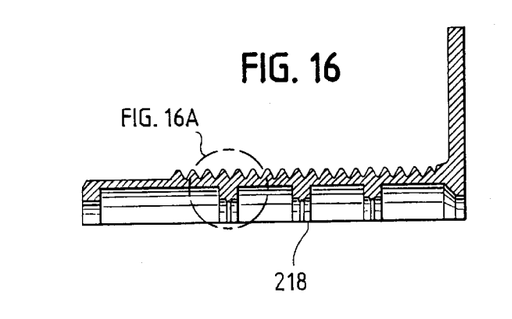
FIG. 16 is a cross sectional view along line 16—16 of FIG. 15C.
Figure 16A:
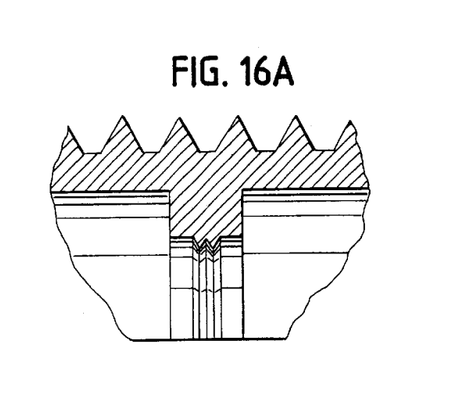

Although the housing 26 has been illustrated with a planar back wall, it will be appreciated that other housing configurations are also suitable. For example, as is shown in broken line in FIG. 12, the housing 26 can have a cone-shaped back face 300 that will fit into drain plug openings of varying diameters. A cone-shaped gasket 302 fits over the cone-shaped back wall to seal the drain opening. The gasket 302 can be a separate component from the housing or it can be in the form of a layer of gasket material bonded to the outside of the housing.

Figure 10:
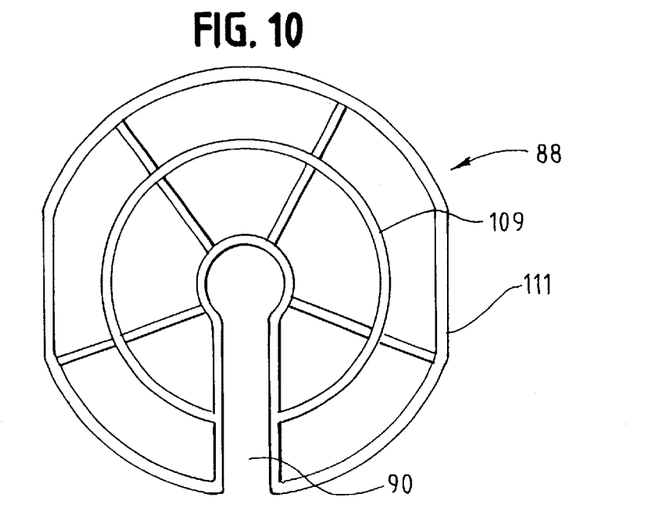
FIGS. 10 and 11 are elevation views of the front and back faces of a nut employed in the present invention.
Figure 11:
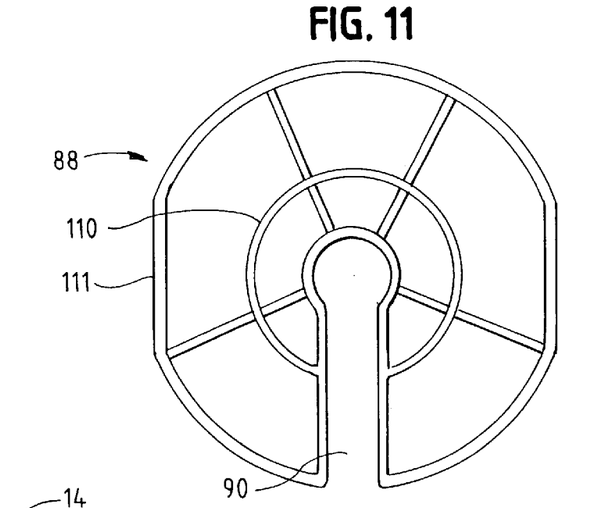

As can be seen in FIGS. 8, 10, and 11 the nut may include annular ribs 109, 110 that are sized to fit within drain plug openings of different diameters. A first face of the nut 88 has an annular rib 109 having a first diameter, whereas a second face of the nut 88 has an annular rib 110 having a reduced diameter compared to the rib on the first face. Each face of the nut 88 also has an outer rib 111 which is configured to abut against the side wall of the water tank 14 when the nut 88 is tightened onto the boss 86. As can be seen in FIG. 8, the inner annular ribs 109, 110 project beyond the outer ribs 111 such that the inwardly facing of the inner annular ribs 109, 110 will extend into the drain plug opening 20 when the nut 88 is tightened onto the boss 86. In this respect, the first annular rib 109 preferably has a diameter of approximately 2.0 inches, whereas the second annular rib 110 preferably has a diameter of approximately 1.5 inches. The interface between the inner annular rib 109, 110 and the drain plug opening 20 functions to support the heater in the tank. Depending on the construction of the water tank, the back wall 94 of the housing 26 may rest on the bottom of the water tank 14 to further support the heating element 12 within the tank. (See FIG. 2).

The distal ends of the heating element 12 are supported above the bottom of the tank by support posts 100. Each support post 100 includes a downwardly extending leg 102 connected to a clamp member 104 in a height adjustable manner. The support leg 102 rests on the bottom wall of the tank 14 and the clamp member 104 in turn engages with the heating element 12 to support it against vertical displacement relative to bottom wall of the tank. In the illustrated embodiment, the support leg 102 is in the form of a conventional bolt, whereas the clamp member 104 is in the form of a pair of dish shaped members 106a, b that are configured to clamp about the heating element 12 at one of its curved portions 72, 80. Nuts 107 thread onto bolt on both sides of the members. The nuts 107 are used to adjust the heights of the members 106, 108 relative to the floor and to clamp the members 106, 108 to the heating element 12. As will be appreciated, the nuts 107 may be integrally formed with the members 106, 108.

The power cord 16 includes detachable connector 120 interposed between the housing 26 and the male plug 22. The connector 120 allows the power cord 16 to be separated into a first section 124 that extends between a first portion 126 of the detachable connector 120 and the housing 26, and a second section 128 that extends between a second portion 130 of the detachable connector 120 and the male plug 22. The connector first portion is in the form of a male connector that carries three conductive pins 132a–c. The conductive pins 132a–c extend from the end of the connector first portion 126 and are oriented for insertion into reciprocal terminal openings 134a–c in the (female) connector second portion 130. In particular, the connector first portion 126 carries a line connector pin 132a, a neutral connector pin 132b, and a ground connector pin 132c. Within the connector first portion 126, the line pin 132a is connected with the line wire 32a from the power cord first portion 124, the neutral pin 132b is connected with the neutral wire 32b from the power cord first portion 124, and the ground pin 132c is connected to the ground wire 132c from the power cord first portion 124.

Similarly, the connector second portion 130 includes a line terminal opening 134a, a neutral terminal opening 134b, and a ground terminal opening 134c. Electrical contacts 136a–c are positioned within the openings 134a–c and are electrically interconnected with the appropriate wires 32a–c from the power cord second portion 128. In particular, a line contact terminal 136a is interconnected with the line wire 32a from the power cord second portion 128, a neutral contact terminal 136b is interconnected with the neutral conductor 32b from the power cord second portion 128, and a ground contact terminal 136c is interconnected with ground wire 32c from the power cord second portion 128.

The connector first portion 126 includes an annular flange 138 or shroud that extends around the connector pins 132. The flange 138 is configured to slide over the reduced diameter annular end portion 140 of the connector second portion 130. A longitudinal rib 142 formed on the inner wall of the flange 138 is configured to slide into a reciprocal slot 144 formed on the annular end portion 140 of the connector second portion 130. The interface between the rib 142 and the slot 144 fixes the orientation of the connector first portion 126 relative to the connector second portion 130, thereby ensuring that the pins 132a–c are inserted into the proper terminals openings 134a–c.

Figure 1:
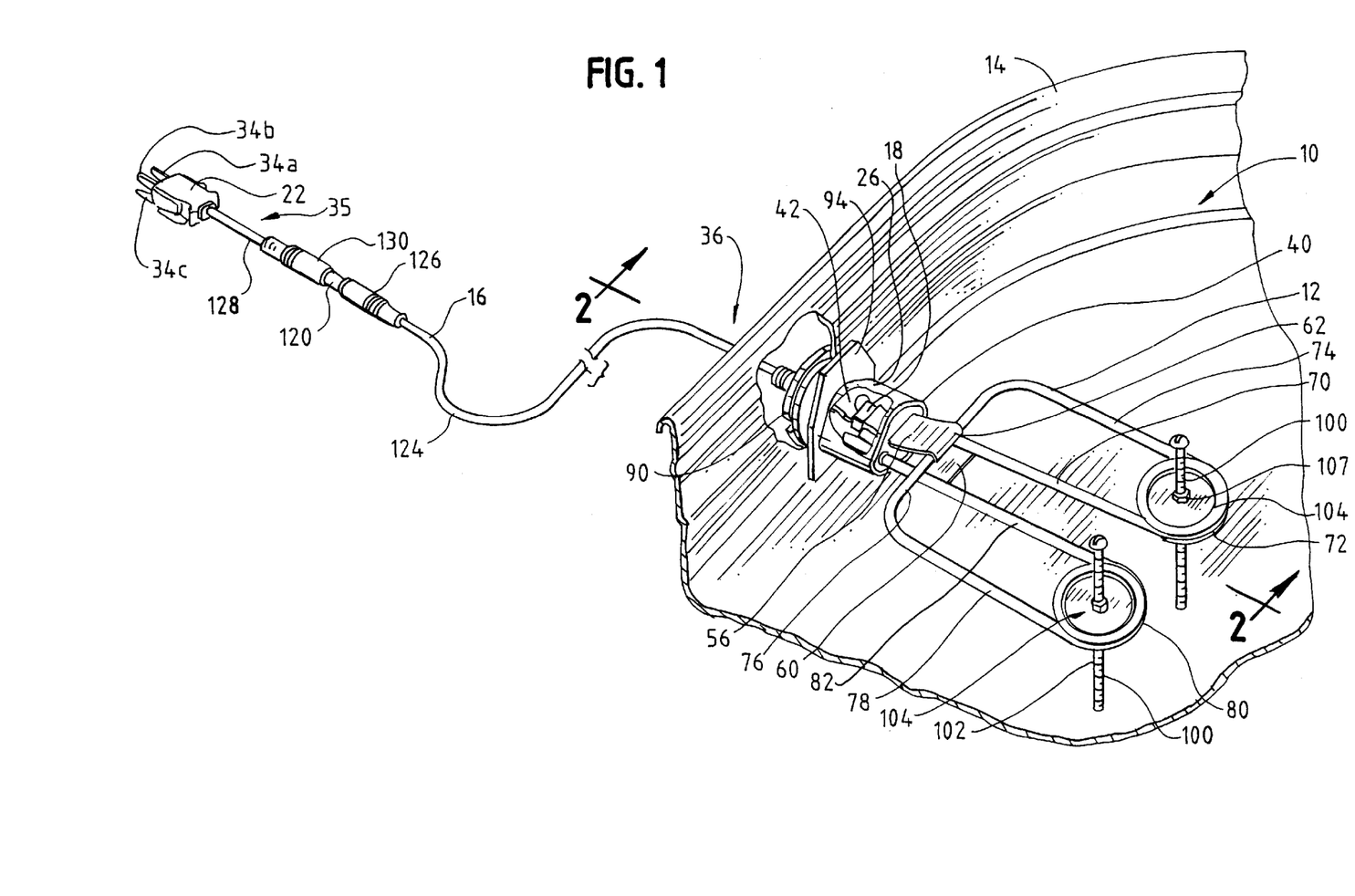
FIG. 1 is a perspective view of an electric heater for a livestock water tank according to the present invention.
Figure 5:
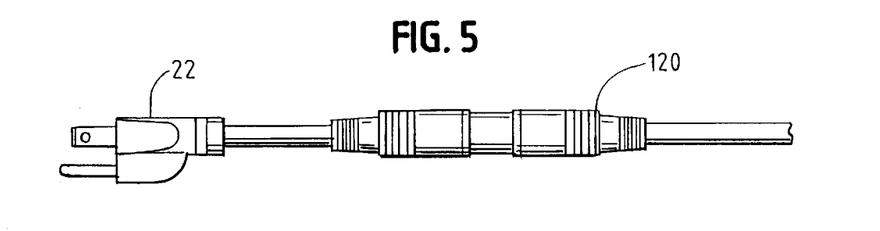
FIG. 5 is a partial elevation view of the power cord of the electric heater of FIG. 1 showing the detachable cord connector at a location adjacent the male plug of the power cord.

In the illustrated embodiment, the detachable connector 120 has round cross-sectional configuration and a tubular overall appearance. However, it will be appreciated that the invention is not limited to the illustrated configuration. For example, the connector 120 could have numerous other cross-sectional shapes, such as square, rectangular or triangular, without departing from the scope of the invention. Moreover, the detachable connector 120 can be located anywhere along the length of the power cord 16. For example, in the embodiment illustrated in FIGS. 1 and 5, the detachable connector is located proximal to the plug 22, whereas in FIG. 6 the detachable connector is shown at a location proximal to the heating element 12. Additionally, a portion of the detachable connector 120 may be integrally formed with either the plug 22 (see, e.g., FIG. 7) or the housing 26 (see, e.g., FIG. 8). In particular, FIG. 7 illustrates an embodiment in which the detachable connector second portion 130 is integrally formed with the male plug 22. In this embodiment, the prongs 34a–c of the plug 22 may be integrally formed with the contact terminals 136a–c of the connector second portion 130, or the prongs 34a–c and contact terminals 136a–c may be interconnected by wires. FIG. 8 illustrates an embodiment in which the detachable connector first portion 126 is integrally formed with the threaded boss 86. In this embodiment, the inner ends of the pins 132a–c are preferably connected to wires that extend through the boss 86 and into the inner cavity 42 where they are interconnected with the heating element 12 and the temperature control device 18.

Figure 6:
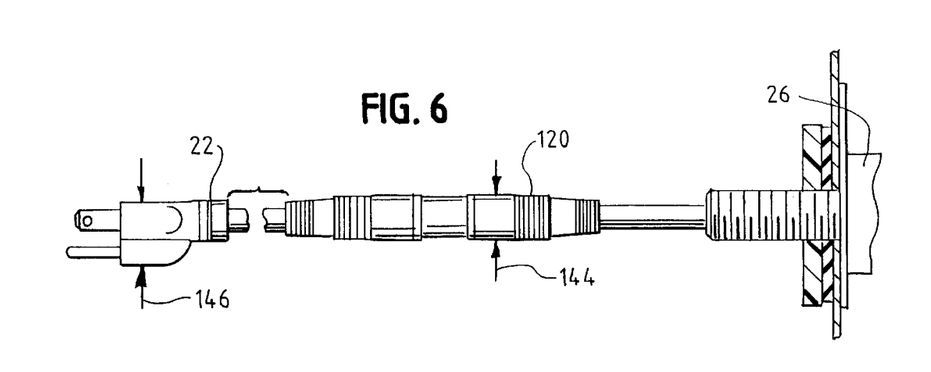
FIG. 6 is a partial side view of the power cord of the electric heater showing an alternative location for the detachable cord connector.
Figure 7:
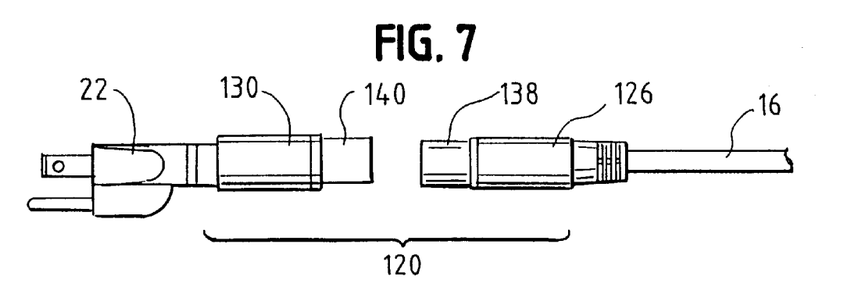
FIG. 7 is a partial side view of the power cord of the electric heater showing an embodiment wherein a portion of the detachable connector is integrally formed with the male plug.
Figure 9:
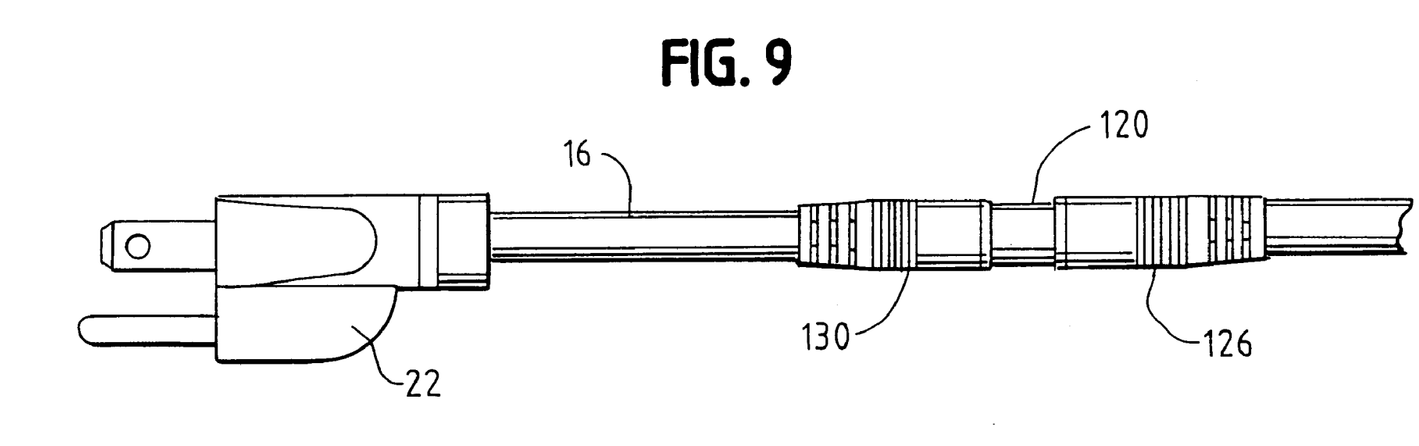
FIG. 9 is a partial side view of the power cord of the electric heater showing a reduced diameter detachable connector.

Referring to FIG. 6, the detachable connector 120 has a maximum outer cross sectional dimension 144 that is smaller than the maximum outer cross-section dimension 146 of the plug 22. Hence, the cord 16 can be separated into two pieces so the cord can be passed through openings that are too small to permit passage of the plug 22. In this respect, it should be noted that commercially available watering tanks have drain plugs as small as 0.75 inches. Therefore, the detachable connector 120 preferably has a maximum outer cross-sectional dimension 144 that is less than 0.75 inches. In many of the illustrated embodiments, the outer cross-sectional dimension 144 of the connector 120 is larger than that of the diameter power cord 16. However, it will be appreciated that the size of connector 120 could be reduced so that its outer cross-sectional dimension approximates that of the power cord 16, as is shown in FIG. 9.

Figure 3:
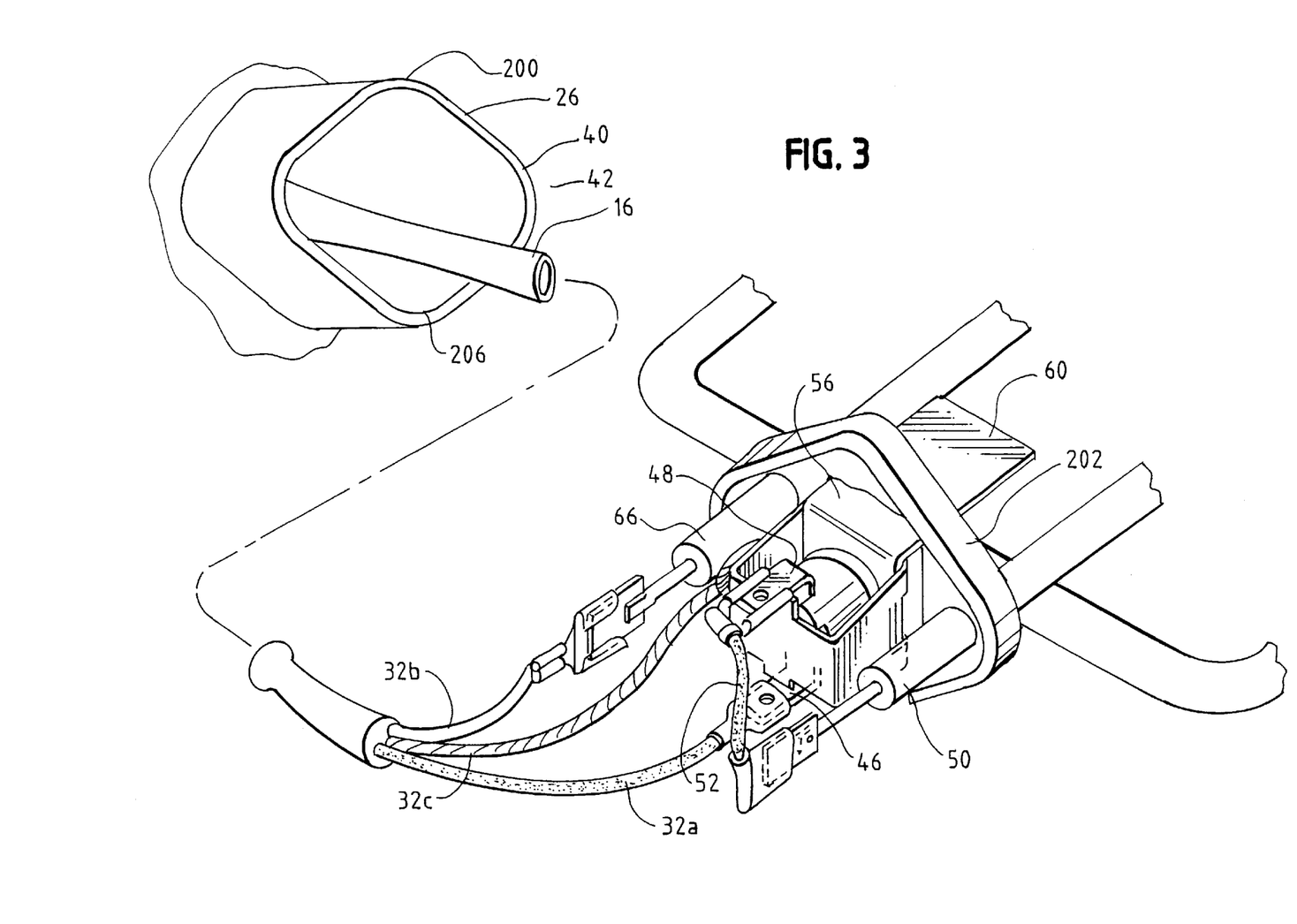
FIG. 3 is a perspective view illustrating the interconnection between the power cord, the heating element and the temperature control device.

As can be seen in FIG. 3, the housing has a two-part construction consisting of a main portion 200 and an end cap 202. The main portion 200 consists of the threaded boss 86, the back wall 94 and the cavity defining outer wall 40. The end cap 202 is configured for insertion into the open end 206 of the wall 40. The first and second ends 50, 66 of the heating element 12 extend through the end cap 202 into the inner cavity 42 of the housing 26. Similarly, the heating and cooling segments 58, 60 of the conductive strap 54 extend out through end cap 202. In this manner, the end cup 202 fixes the orientation of the segments 58, 60 relative to each other and relative to the heating element 12.

Installation of the tank heater 10 will now be described with reference to the drawings. Initially, the drain plug (not shown) is removed from the water tank 14 and the heater 10 is positioned on the floor of the tank. The power cord 16 is separated into two sections 124, 128 and the connector first portion 126 is fed out through the drain plug opening 20. The washer 92 is then slid over the power cord first portion 124 from its distal end and into position over the boss 86. The threaded boss 86 is then pushed through the drain plug opening 20 and the back wall 94 of the housing 26 is aligned against the inside of the tank wall. The nut 92 is then slid into place on the power cord first portion 124 and threaded onto the boss 86. As the nut 88 is tightened into place, the washer 92 is compressed between the tank 14 and the housing 26 to form a watertight seal at the opening 20. The connector first and second portions are then reconnected to each other by inserting the pins 132a–c into the openings 134a–c.

FIGS. 13–16 show an alternative embodiment comprising a removable drain plug adapter 200. The drain plug adapter 200 includes a connector portion 202 that is removably mountable about the power cord 16 at a location between the heating element 12 and the male plug 22. The drain plug connector portion 202 has a first portion 204 that is larger than the drain plug opening and a threaded boss 206 extending from the first portion and being sized for insertion through the drain plug opening 20. In the illustrated embodiment, the first portion 204 comprises a planer wall which is configured to abut against the sidewall of the tank, as was described above in connection with the backwall of the housing 26. It will be appreciated, however, that this construction may be varied without departing from the scope of the claimed invention. For example, the first portion incorporates a cone shaped face, as is described above in connection with FIG. 12. Similarly, the boss 206 is constructed in accordance with the threaded boss 86, as described above. A reciprocal nut 210, similar construction to the nut 88, threads onto the boss 206 from outside of the tank 14 to secure the adapter 200 in the drain plug opening 20. A washer 212, similar in construction to the washer 92 is positioned about the boss 206 and is compressed around the drain plug opening 20 as the nut is threaded on the boss, thereby preventing water leakage through the drain plug opening. As can best be seen in FIG. 14, the drain plug connector 206 comprises two identical halves 214a, 214b that are configured to clamp about the power cord 16. The interior of the boss includes a plurality of annular rings 218 that are sized to compress around the outer sheath of the power cord 16 and form a water tight seal thereabout. However, the invention is equally applicable to floating heaters that are designed to float at or near the water's surface.

Although the invention has been described with reference to preferred embodiments, workers skilled in the art will recognize that changes may be made in form and detail without departing from the scope and spirit of the invention. For example, the invention has been illustrated in connection with sinking heaters that are designed to sink to the bottom of the water tank.

What is claimed is:

1. A drain plug adapter which is removably mountable about the power cord of an electric heater and which permits the power cord to be routed through the drain plug opening of a livestock water tank while maintaining a water tight seal through drain plug opening, comprising:

a connector configured to clamp around the power cord, the connector defining a central passage which is sized to receive the power cord, at least a portion of the passage being sized to compress around the power cord and form a watertight seal thereabout, the connector including an enlarged portion which is larger than the drain plug opening and a threaded boss extending from the enlarged portion and being sized for insertion through the drain plug opening;

a nut threadable onto the boss for securing the connector portion within the drain plug opening; and a seal being adapted to seal the drain plug opening around the boss to prevent water leakage therethrough.

2. A drain plug adapter as set forth in claim 1, wherein the connector comprises first and second portions, which are configured to clamp around the power cord.

3. A drain plug adapter as set forth in claim 1, further comprising at least one annular ring formed in the central passage, the annular ring being sized to compress around the power cord to form a water tight seal thereabout.

4. A drain plug adapter as set forth in claim 3, further a plurality of annular rings formed in the central passage, each of the annular rings being sized to compress around the power cord to form a water tight seal thereabout.

5. A drain plug adapter as set forth in claim 1, wherein the nut includes a slot to allow the nut to be slide laterally over the power cord.

6. A drain plug adapter as set forth in claim 1, wherein the seal comprises a washer which is mounted on the boss compressed between the drain plug adapter and the water tank as the nut is threaded onto the boss.

7. An electric water tank heater for mounting in a water tank having a drain plug opening, comprising:
   an electric heating element;
   a power cord having a first end interconnected with a male electrical plug and a second end interconnected with the electrical heating element for delivering power thereto;
   a drain plug adapter removably mountable about the power cord, the drain plug adapter being configured for installation through the drain plug opening and being adapted to seal the drain plug opening against water leakage therethrough, the drain plug adapter comprising:
      a connector configured to clamp around the power cord, the connector defining a central passage sized to receive the power cord, at least a portion of the passage being sized to compress around the power cord and form a watertight seal thereabout, the connector including an enlarged portion which is larger than the drain plug opening and a threaded boss extending from the enlarged portion and being sized for insertion through the drain plug opening;
      a nut threadable onto the boss for securing the connector portion within the drain plug opening; and
      a seal adapted to seal the drain plug opening around the boss to prevent water leakage therethrough.

8. A drain plug adapter as set forth in claim 7, further comprising at least one annular ring formed in the central passage, the annular ring being sized to compress around the power cord to form a water tight seal thereabout.

9. A drain plug adapter as set forth in claim 8, further a plurality of annular rings formed in the central passage, each of the annular rings being sized to compress around the power cord to form a water tight seal thereabout.

10. A drain plug adapter as set forth in claim 7, wherein the nut includes a slot to allow the nut to be slide laterally over the power cord.

11. A drain plug adapter as set forth in claim 7, wherein the seal comprises a washer which mounts on the boss and which is compressed between the drain plug adapter and the water tank as the nut is threaded onto the boss.

12. A drain plug adapter as set forth in claim 7, wherein the power cord includes a detachable connector interposed between the heating element and the male plug such that the power cord can be separated into a first section extending between a first portion of the detachable connector and the heating element and a second portion extending between a second portion of the detachable connector and the male plug, at least one of the first and second portions of the detachable connector being sized for insertion through the drain plug opening.

* * * * *